United States Patent
Bayer et al.

(10) Patent No.: US 7,478,573 B2
(45) Date of Patent: Jan. 20, 2009

(54) DIFFERENTIAL DRIVE FOR A SUPERIMPOSED STEERING SYSTEM

(75) Inventors: Ronald Bayer, Muhlheim/Main (DE); Johann Jungbecker, Badenheim (DE); Steffen Linkenbach, Eschborn (DE); Joachim Nell, Hanau (DE); Norman Muth, Frankenberg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 216 days.

(21) Appl. No.: 10/515,879

(22) PCT Filed: May 20, 2003

(86) PCT No.: PCT/EP03/05289

§ 371 (c)(1), (2), (4) Date: Jul. 14, 2005

(87) PCT Pub. No.: WO03/099630

PCT Pub. Date: Dec. 4, 2003

(65) Prior Publication Data

US 2006/0011405 A1 Jan. 19, 2006

(30) Foreign Application Priority Data

May 24, 2002 (DE) ................. 102 23 049
Dec. 17, 2002 (DE) ................. 102 59 274

(51) Int. Cl.
 *F16D 15/00* (2006.01)
 *F16D 23/00* (2006.01)
 *F16D 43/00* (2006.01)
 *F16D 41/06* (2006.01)

(52) U.S. Cl. .................. 74/388 R; 192/45.1; 192/45.2

(58) Field of Classification Search ............. 74/388 R; 180/6.26; 192/45, 45.1, 48.91, 48.92, 45.2
See application file for complete search history.

(56) References Cited

U.S. PATENT DOCUMENTS

| | | | | |
|---|---|---|---|---|
| 4,953,650 | A * | 9/1990 | Ohmura | 180/412 |
| 4,987,790 | A * | 1/1991 | Weismann | 74/333 |
| 4,989,704 | A * | 2/1991 | Morishita et al. | 192/45 |
| 5,019,981 | A * | 5/1991 | Oshita et al. | 701/41 |
| 6,164,150 | A * | 12/2000 | Shindo et al. | 74/388 PS |
| 6,718,242 | B1 * | 4/2004 | Mori et al. | 701/41 |

FOREIGN PATENT DOCUMENTS

| | | |
|---|---|---|
| DE | 198 23 031 | 11/1998 |
| DE | 100 00 219 | 7/2001 |
| DE | 101 59 700 | 11/2002 |
| DE | 101 59 800 | 12/2002 |
| EP | 787640 A2 * | 8/1997 |

OTHER PUBLICATIONS

Patent Abstracts of Japan, vol. 1999, No. 08, Jun. 30, 1999 & JP 11 072128 A (Aichi Corp), Mar. 16, 1999, Abstract.
International Search Report of Application No. PCT/EP03/05289 dated Sep. 22, 2003.

* cited by examiner

*Primary Examiner*—Tisha D Lewis
(74) *Attorney, Agent, or Firm*—RatnerPrestia

(57) ABSTRACT

An overriding drive for an overriding steering system, wherein a steering angle inputted by the driver can be overridden by another angle by a control according to correcting variables and the transmission ratio can be modified, and which is characterized in that the overriding drive is locked electromechanically in dependence on further correcting variables representative of an operating state of the vehicle.

4 Claims, 6 Drawing Sheets

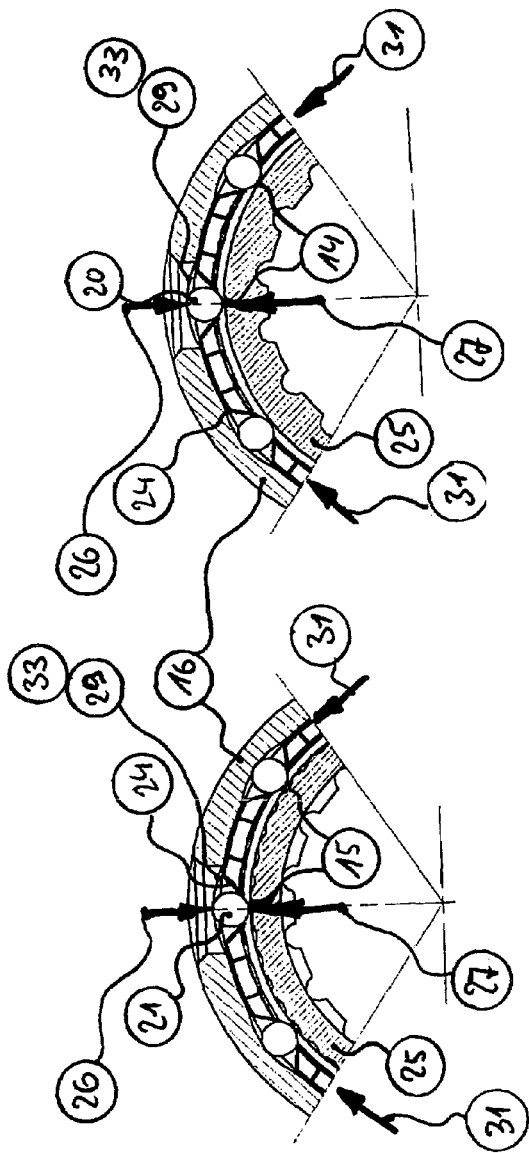
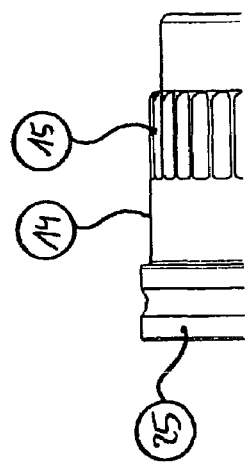
Fig. 6
Fig. 7
Fig. 8

US 7,478,573 B2

DIFFERENTIAL DRIVE FOR A SUPERIMPOSED STEERING SYSTEM

TECHNICAL FIELD

The present invention relates to a locking device and an overriding drive for an overriding steering system, wherein a steering angle inputted by the driver can be overridden by another angle by means of a control according to correcting variables.

BACKGROUND OF THE INVENTION

Up-to-date motor vehicles, in particular passenger vehicles, are generally equipped with hydraulic or electrohydraulic servo steering systems, wherein a steering wheel is forcibly coupled mechanically to the steerable vehicle wheels. The power assistance is so configured that actuators, e.g. hydraulic cylinders, are arranged in the mid-area of the steering mechanism. A force generated by means of the actuators assists the actuation of the steering mechanism in response to the rotation of the steering wheel. This arrangement reduces the force the driver has to exert during the steering maneuver.

Overriding steering systems are disclosed in DE 101 59 800 A1 and DE 101 59 700 A1, the contents of which are part of the application and on which the application is based. Said overriding steering systems are characterized in that it is possible for an actuator to superimpose another angle, if required, on the steering angle inputted by the driver. The additional angle is defined by a controller and used to enhance the stability and agility of the vehicle. It is also feasible to compensate disturbances and to realize the gradient wheel steering angle by way of the steering wheel angle as a function of the driving speed of the vehicle. Hydraulic or electric actuators are used.

BRIEF SUMMARY OF THE INVENTION

An object of the invention is to provide an overriding drive or a locking device, wherein the driver can apply a steering angle to the wheels of the vehicle when the electronics or the energy supply fails.

According to the invention, this object is achieved in that the overriding drive is locked electromechanically in dependence on further correcting variables representative of an operating state of the vehicle. In the overriding drive, a superposition with another angle allows additionally or simultaneously changing the transmission ratio in a favorable way. The overriding drive of the overriding steering system according to the invention in particular enables a safe and comfortable operation.

It is advantageous that quantities such as ignition on/off, engine rotational speed and like factors are monitored to detect the operating state, and that the quantities are analyzed for detecting whether the engine is or is not switched off or an energy supply is or is not safeguarded, respectively. The plausibility of the motor's position and of the sensor signals is monitored to enhance the reliability in operation.

In a favorable embodiment, the overriding drive includes a freewheeling mechanism, which is lockable in operative and/or positive engagement.

The activation of the locking is preferably switchable and, in an especially preferred fashion, it takes place simultaneously for the operative and positive locking.

In another favorable design, the operative locking is provided by at least one first clamping member, preferably by three to nine clamping members, being brought into frictional contact with an inner ring of the freewheeling mechanism by way of a radial actuation, while the positive locking is provided by at least one second clamping member, preferably by three to nine clamping members, being brought into a form-fit contact with the inner ring of the freewheeling mechanism by way of a radial actuation.

In addition, it is favorable that a first actuating ring is associated with the freewheeling mechanism for the positive connection and a second actuating ring is associated therewith for the frictional connection, said rings being entrained with the clamping members upon radial actuation thereof so that rotation of the inner ring is prevented by means of a clamping contour at an outer ring of the freewheeling mechanism. Favorably, a defined angle, i.e. twisting angle, is allowed due to the frictional connection before a positive connection develops.

The object of the invention is also achieved by way of a locking device that is preferably provided for an overriding drive of the type described hereinabove and characterized by the provision of a freewheeling mechanism, which is operatively and/or positively lockable.

The activation of the locking is preferably switchable and, in an especially preferred fashion, it takes place simultaneously for the operative and positive locking.

In a favorable design, the operative locking is provided by at least one first clamping member, preferably by three to nine clamping members, being brought into frictional contact with an inner ring of the freewheeling mechanism by way of a radial actuation, while the positive locking is provided by at least one second clamping member, preferably by three to nine clamping members, being brought into a form-fit contact with the inner ring of the freewheeling mechanism by way of a radial actuation.

Preferably, the first clamping member is elastically arranged and permits a defined angle, i.e. twisting angle.

It is arranged for by the invention that a first actuating ring is associated with the freewheeling mechanism for the operative or frictional connection and a second actuating ring is associated therewith for the positive connection, said rings being entrained with the clamping members upon radial actuation thereof so that rotation of the inner ring is prevented by means of a clamping contour at an outer ring of the freewheeling mechanism.

Advantageously, it is provided that locking is effected by an electromechanical transducer that includes a first actuating element for the operative or frictional connection and a second actuating element for the positive connection, said actuating elements acting on the clamping members and being moved by an electromagnetically operable armature in opposition to a spring force for the purpose of locking or unlocking the freewheeling mechanism. This design according to the invention renders it possible to safely fix or lock an element that shall be locked by using very low adjusting and retaining forces and, thus, only low (electrical) energy. The result is that only a small mounting space is required.

According to the invention, the freewheeling mechanism has a stepped contour so that the inner ring is initially retained by means of a frictional connection.

BRIEF DESCRIPTION OF THE DRAWINGS

In the drawings,

FIG. 6 is a first section of the freewheeling mechanism with locking device.

FIG. 7 is a second section of the freewheeling mechanism with locking device.

FIG. 8 is a side view of a section of the freewheeling mechanism.

DETAILED DESCRIPTION OF THE PREFERRED EMBODIMENTS

Figure 1:
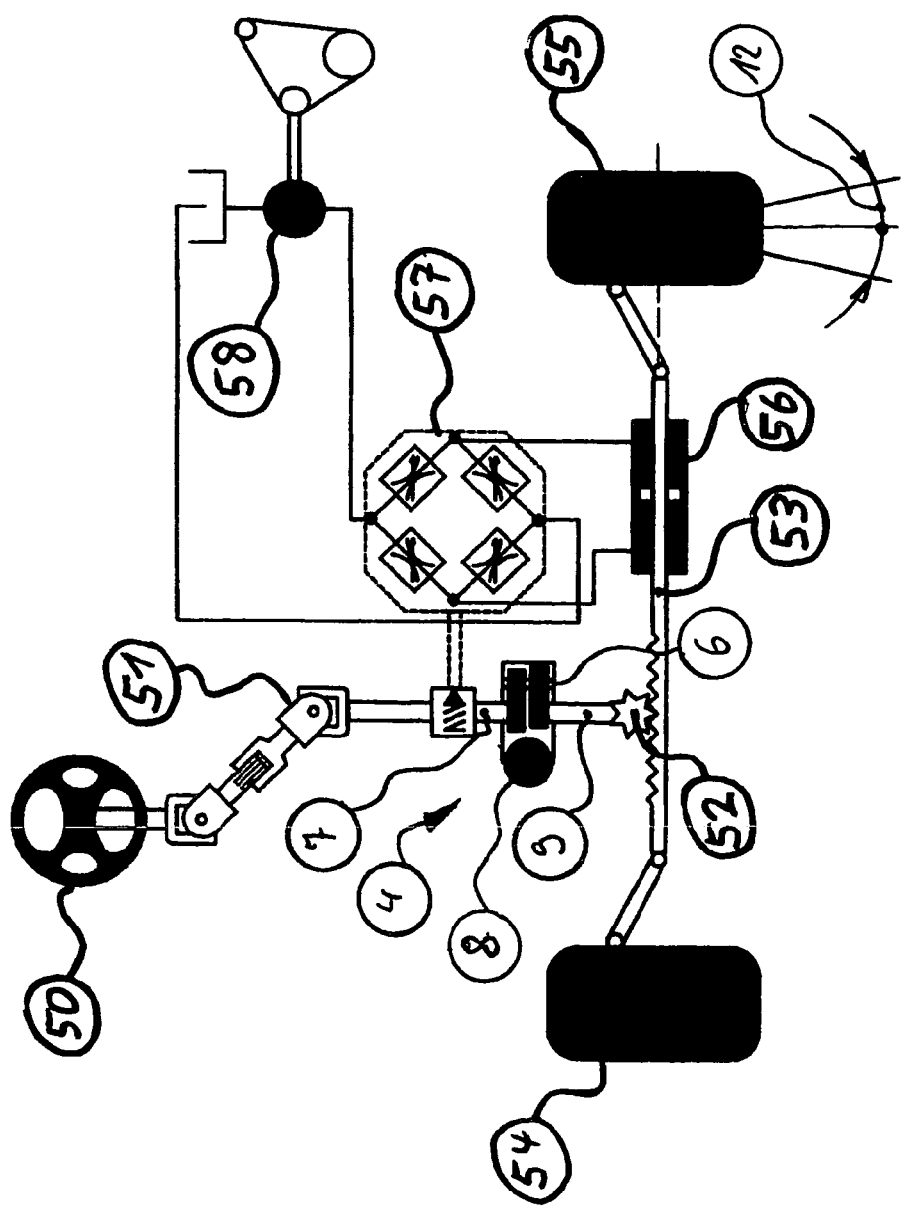
FIG. 1 is a schematic general overview of the overriding steering system of the invention.

The overriding steering system shown in FIG. 1 includes a hand steering wheel 50 that is connected to a steering rod 53 by way of a steering column 51, into which an overriding drive 6 is inserted, and by way of a steering gear 52. Displacement of the steering rod 53 permits turning of the wheels 54, 55. Turning of the wheels 54, 55 is assisted by means of a hydraulic unit 56 and by a corresponding control of the hydraulic pressure by means of a valve unit 57. A pump 58 generates the pressure.

The function of an overriding drive 6 in the overriding steering system shown in FIG. 1 involves adjusting an overriding angle 12 irrespective of the driver through a control by means of correcting variables which can be produced e.g. by a driving dynamics system (ESP controller). To this end, a planetary gearing with two sun wheels and three step planet pinions as described in DE 101 59 8000 A1 or DE 101 59 700 A1 is used. The step planet pinions are mounted in a satellite carrier (cage). However, the invention is expressly not limited to a planetary gearing as overriding drive 6. Thus, all other pick-off gears known in the art may be used as well.

The transmission ratio of the vehicle steering system is composed of the transmission ratio of the steering gear and the overriding drive. Where the objective is to modify the transmission ratio to a defined transmission ratio, it is necessary to additionally drive a component of the overriding drive. Said driving is carried out by way of an electric motor (E-Motor) 8, whereby the variation of the transmission ratio is possible in a wide range.

The motor 8 can be coupled to the gear 6, thus, to the planet cage in the case of a planetary gearing, by means of a self-locking gear (worm gear or helical gear) or a non self-locking gear (drawing means gearing or toothed gearing) Preferably, however, a drawing means gearing, in particular a belt drive, is used.

To realize a fixed transmission ratio in operating states when the motor 8 is switched off, it is absolutely necessary to fix the overriding drive 6. To this end, the cage is prevented from turning in a planetary gearing. This is possible by means of locking of the gear components to be locked, meaning the cage in a planetary gearing, e.g. in relation to a stationary housing, while a first gear shaft (gear input shaft) 7 is directly connected to a second gear shaft (gear output shaft) 9 by transmission means, especially through the planets of the gear. It is provided in the invention that the cage of the planetary gearing is positively and operatively lockable in dependence on the operating states.

Figure 2:
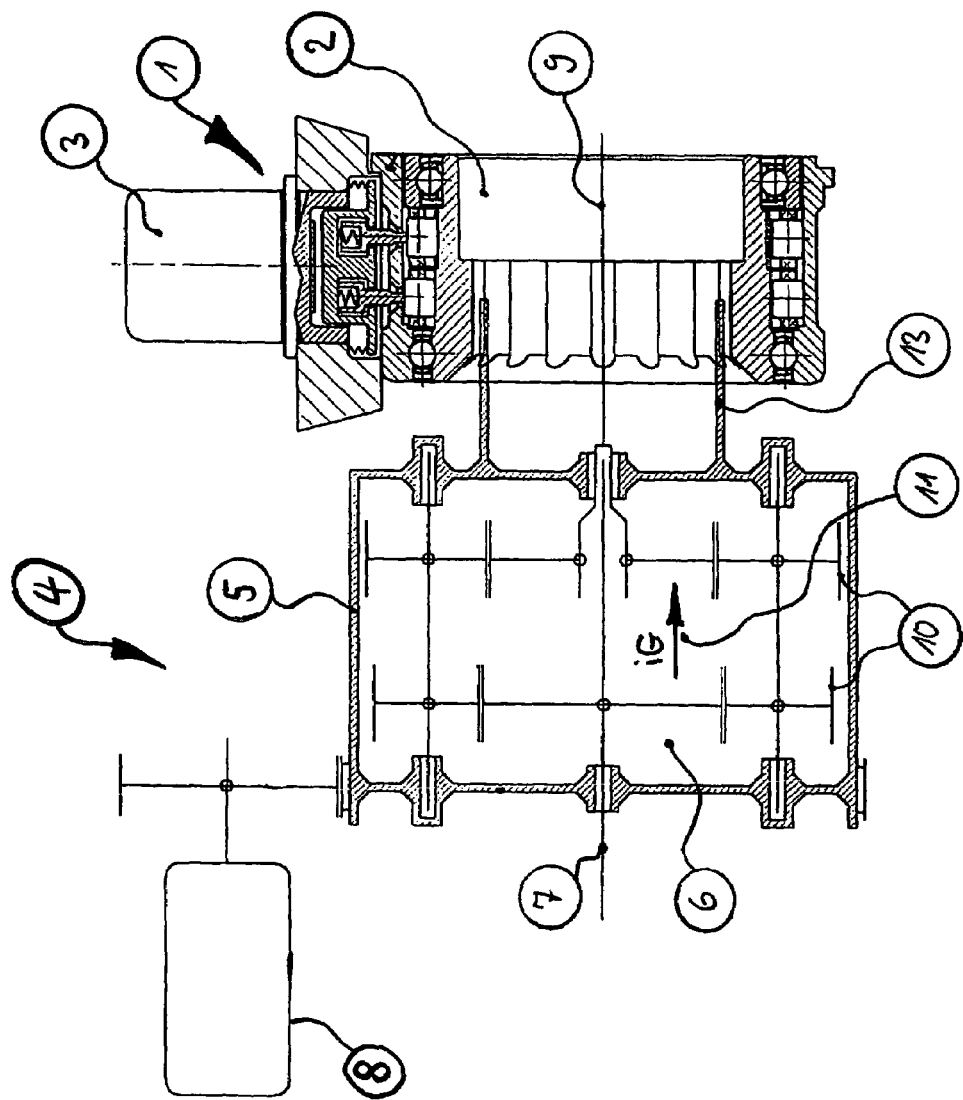
FIG. 2 is a schematic view of a planetary gear with a freewheeling mechanism and a locking device according to the invention.
Figure 3:
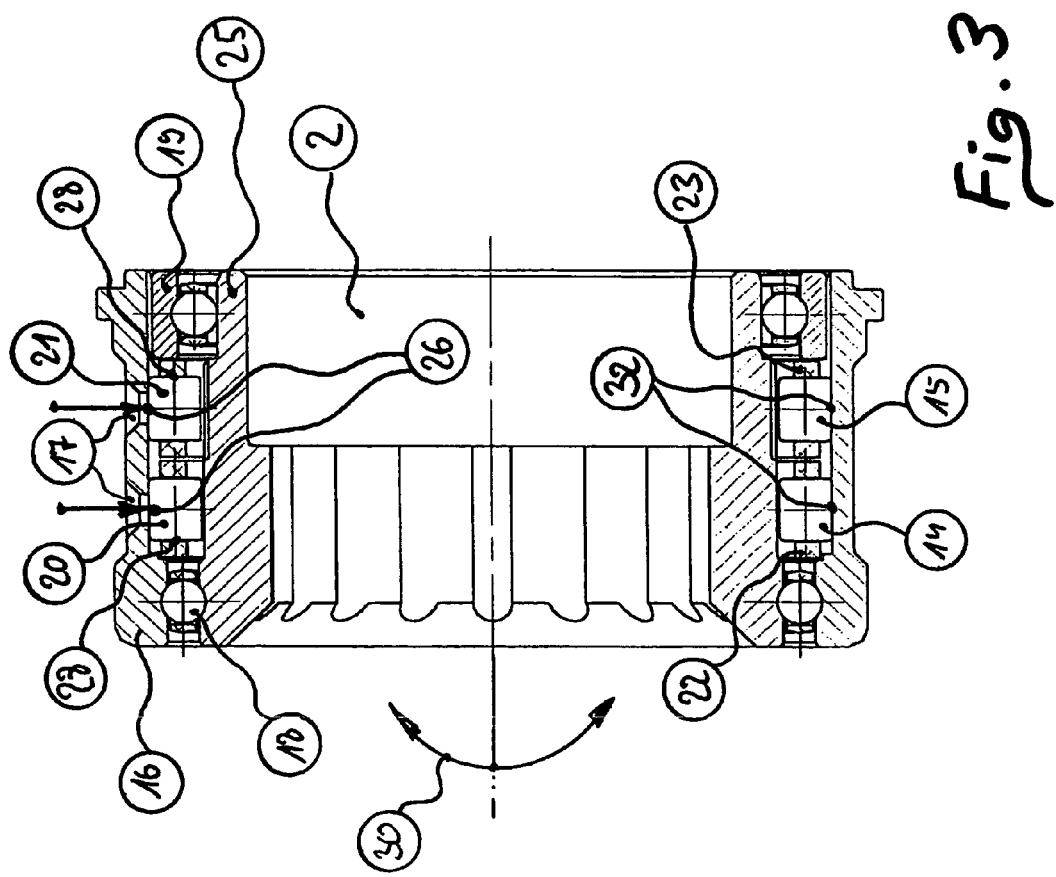
FIG. 3 is a view of the freewheeling mechanism with locking device.
Figure 4:
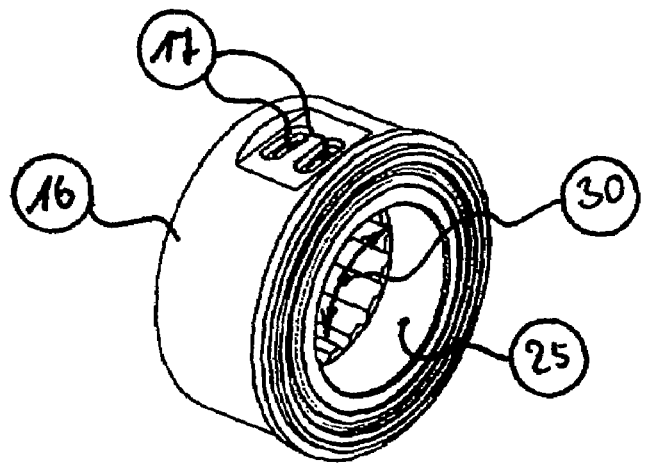
FIG. 4 is a perspective view of the freewheeling mechanism.
Figure 5:
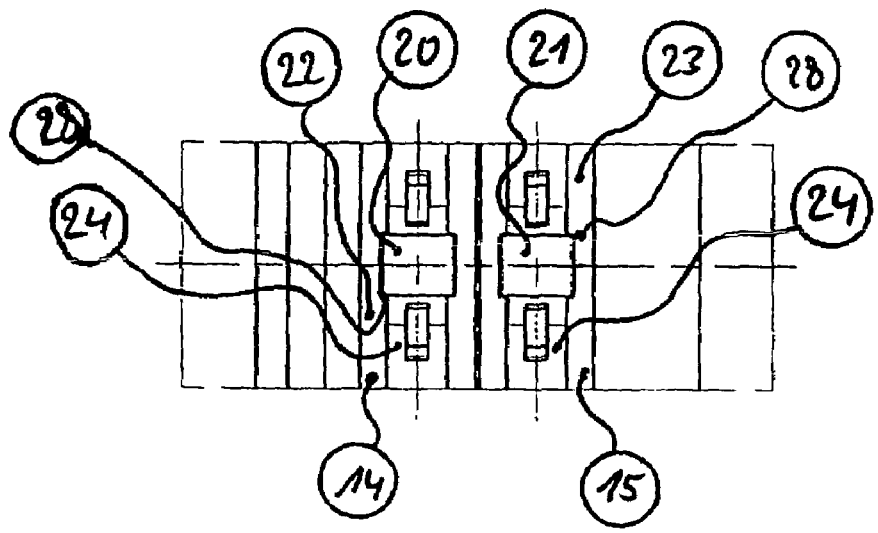
FIG. 5 is a top view of a section of the freewheeling mechanism with locking device.

FIG. 2 schematically shows the locking device with a freewheeling mechanism and a planetary gearing as an overriding drive in more detail.

The locking device 1 includes an electromechanical actuating unit 3 and a positive and operative freewheeling mechanism 2. The locking device 1 is coupled positively to the gear housing 5 by way of a clutch 13. Preferably, the locking device 1 is herein used in an electromechanical overriding steering system (ESAS) (4) for motor vehicles. Other ranges of application with similar safety-relevant requirements are also feasible for the locking device 1.

In the above-mentioned application, the gear housing 5 of the overriding drive 6 is locked by way of the locking device 1 in the non-activated condition or in the case of a fault. Thus, a throughgrip of the two gear shafts 7, 9 is effected by way of the planetary gearing 10 with a transmission ratio iG 11 in a range of roughly 1:1.0 to roughly 1:1.2, preferably 1:1.1 or 1:1.2. The overriding steering angle 12 is locked then.

The freewheeling mechanism 2 and the adjacent components of the locking device 1 are illustrated in FIGS. 3 to 8 in more detail. The locking device 1 of the invention is a functionally relevant component. In the de-energized condition of the electromechanical actuating unit 3, the freewheeling mechanism 2 is locked by way of the one operatively connected freewheeling mechanism 14 and a positively connected freewheeling mechanism 15.

Said freewheeling mechanism 2 generally includes an outer ring 16, an actuation throughgrip 17, an immovable bearing 18, a movable bearing 19, a clamping member 20 for a frictional connection, a clamping member 21 for a positive connection, an actuating ring 22 for the frictional connection, an actuating ring 23 for the positive connection, a spring element 24, and an inner ring 25.

When the clamping members 20, 21 are actuated radially by means of an actuating force 26 in opposition to the spring force 27 induced by the spring elements 24, the clamping members 20, 21 will get into contact with the rotating or immovable inner ring 25 in frictional and positive connection (see FIGS. 6 and 7). The frictional and positive connection causes entrainment of the two actuating rings 22, 23 by way of the spring force 27 and the positive connection 28 and operative connection with the clamping members 20, 21. The result is that the clamping members 20, 21 are clamped between the outer ring 16 and the inner ring 25 by means of the clamping contour 29 provided in the outer ring 16, and block further rotation 30 of the inner ring 25 on both sides.

When the actuating force 26 is released again, the acting spring force 27 will produce a restoring torque 31 at the actuating rings 21, 22, and the clamping members 20, 21 are reset to their zero position 32 when the rotation 30 is reversed. The resetting torque of the actuating rings 22, 23 produced by the spring elements 24 is increased in the zero position 32 due to a special contour 33 of the clamping contour 29. The embodiment illustrated in FIGS. 2 to 8 provides a high degree of functionality of the freewheeling mechanism 2 and ensures safe unlocking in the non-actuated condition. The actuating unit 3 of the locking device 1 is shown in detail in FIGS. 9 and 10. The purpose of said unit is to ensure safe locking of the freewheeling mechanism 2 by means of a positive and frictional connection. The actuating unit 3 is substantially composed of an electromechanical transducer 34, an armature 35, an actuating element 36 for a frictional connection, an actuating element 37 for a positive connection, a compression spring 38, and an armature spring 39.

In the energized condition (see FIG. 10), the armature 35 is attracted by means of the electromechanical transducer 34 in opposition to an integrated spring element 39 and maintains the two actuating elements 36, 37 in their unlocking position 41 by means of an integrated stop 40. Both freewheeling mechanisms 14, 15 adopt their unlocked position. This allows free rotation of the inner ring 25. The armature 35 is not positively connected to the electromechanical transducer 34 and is attracted and retained alone by way of electromagnetic air slot forces 42. When the electromechanical transducer is separated from the housing 43 for mechanical reasons, the non-mechanical coupling to the armature 35 will cause the armature to instantaneously lock the freewheeling mechanism 2 by means of the armature spring 39.

Figure 9:
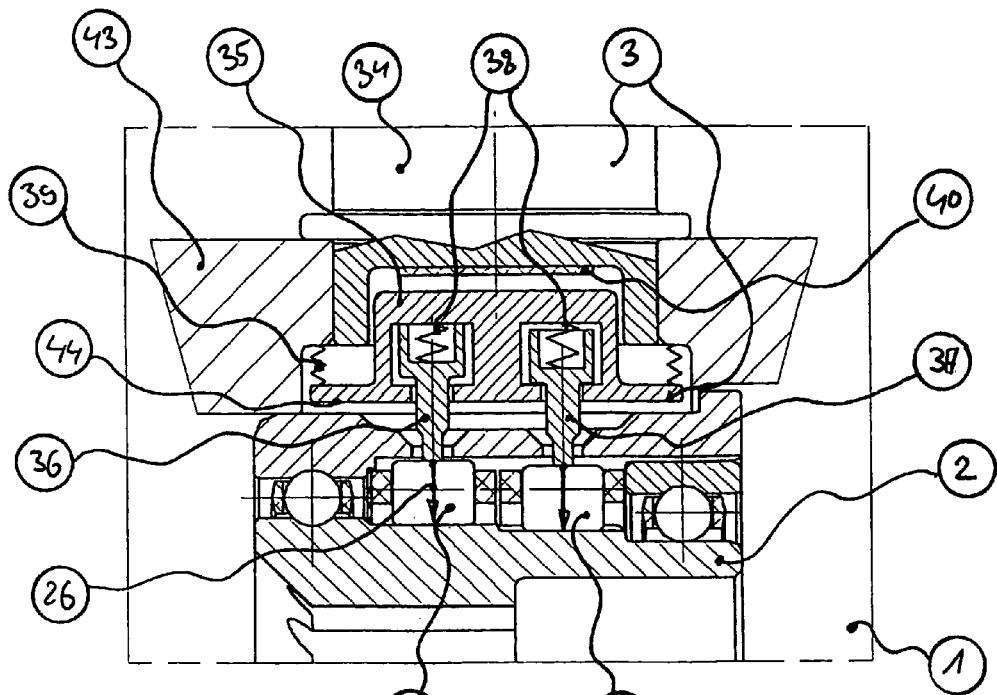
FIG. 9 is a section of the freewheeling mechanism with locking device in the de-energized condition.
Figure 10:
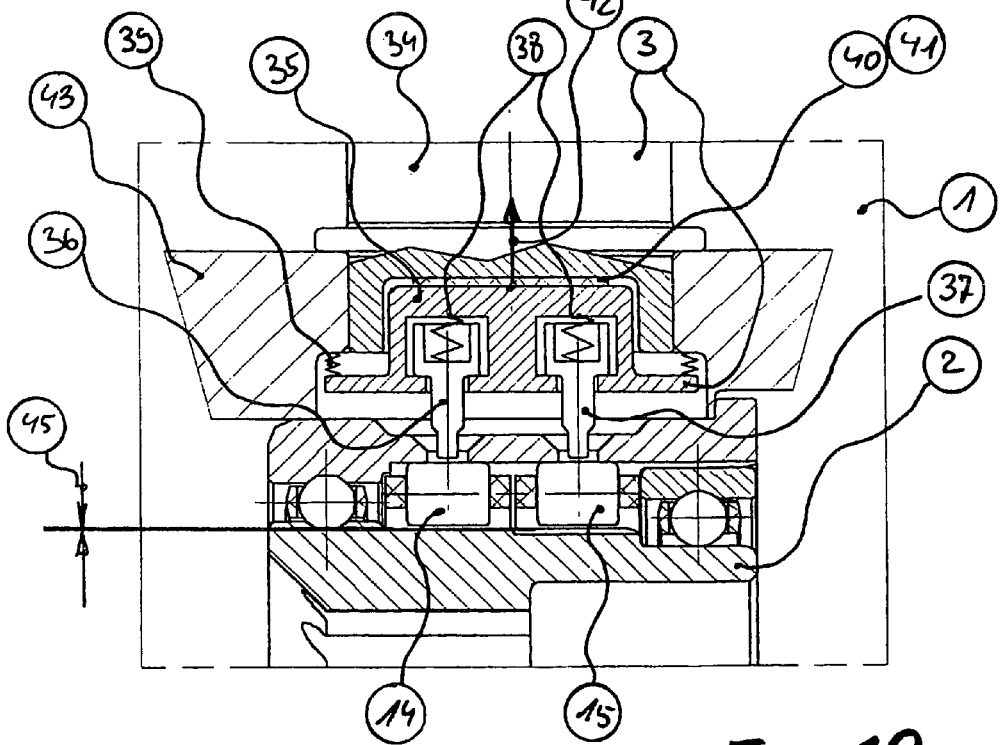
FIG. 10 is a section of the freewheeling mechanism with locking device in the energized condition.

When the current at the electromechanical transducer 34 drops, the armature spring 39 integrated at the armature 35 will urge the armature 35 downwards into the locking position 44 (see FIG. 9). The actuating forces 26 acting will activate both freewheeling mechanisms 14, 15 to lock the inner ring 25 of the freewheeling mechanism 2. Due to a stepped diameter 45 of the positive and frictional connection 14, 15, the freewheeling mechanism 2 is so configured that the frictional connection 14 will initially lock the inner ring 25. When the frictional connection is creeping, the actuating element of the positive connection 37 loaded by the compression spring 38 will push the clamping member 21 and safely lock the positively connected freewheeling mechanism 15. Safety is optimized in that there is no mechanical coupling between the electromechanical transducer 34 and the armature 35.

Thus, safe locking is ensured in every situation by means of the integration of a positively and operatively connected freewheeling mechanism 14, 15 of the invention, effecting a high degree of operational safety of the electromechanical actuating unit 3, while the positive connection is favorably used to 'slow down' the planet cage.

The invention claimed is:

1. Overriding drive for an overriding steering system, wherein a steering angle inputted by the driver can be overridden by another angle by means of a control according to correcting variables, and wherein the overriding drive is locked electromechanically in dependence on further correcting variables representative of an operating state of the vehicle, the overriding drive including a freewheeling mechanism having an inner ring, which inner ring is configured to be locked in both operative engagement by at least a first clamping member and positive engagement with a second clamping member, wherein the operative locking is provided by the at least one first clamping member, being brought into frictional contact with the inner ring of the freewheeling mechanism by way of a radial actuation, and the positive locking is provided by the at least one second clamping member, being brought into a form-fit contact with the inner ring of the freewheeling mechanism by way of a radial actuation and wherein a first actuating ring is associated with the freewheeling mechanism for the positive connection and a second actuating ring is associated therewith for the operative connection, said rings being entrained with the clamping members upon radial actuation thereof so that rotation of the inner ring is prevented by means of a clamping contour at an outer ring of the freewheeling mechanism.

2. Locking device, which includes a freewheeling mechanism that has an inner ring that is both operatively and positively lockable by distinct clamping members, wherein the operative locking is provided by at least one first clamping member, being brought into frictional contact with the inner ring of the freewheeling mechanism by way of a radial actuation, and the positive locking is provided by at least one second clamping member, being brought into a form-fit contact with the inner ring of the freewheeling mechanism by way of a radial actuation and wherein a first actuating ring is associated with the freewheeling mechanism for the operative connection and a second actuating ring is associated therewith for the positive connection, said rings being entrained with the clamping members upon radial actuation thereof so that rotation of the inner ring is prevented by means of a clamping contour at an outer ring of the freewheeling mechanism.

3. Locking device as claimed in claim 2, wherein the freewheeling mechanism has a stepped contour so that the inner ring of the freewheeling mechanism is initially retained by means of a frictional connection.

4. Locking device, which includes a freewheeling mechanism that has an inner ring that is both operatively and positively lockable by distinct clamping members, wherein the operative locking is provided by at least one first clamping member, being brought into frictional contact with the inner ring of the freewheeling mechanism by way of a radial actuation, and the positive locking is provided by at least one second clamping member, being brought into a form-fit contact with the inner ring of the freewheeling mechanism by way of a radial actuation and wherein locking is effected by an electromechanical transducer that includes a first actuating element for the operative connection and a second actuating element for the positive connection, said actuating elements acting on the clamping members and being moved by an electromagnetically operable armature in opposition to a spring force for the purpose of locking or unlocking the freewheeling mechanism, respectively.

* * * * *